(12) United States Patent
Fry et al.

(10) Patent No.: US 7,676,445 B2
(45) Date of Patent: Mar. 9, 2010

(54) APPARATUS, SYSTEM AND METHOD FOR DEVELOPING FAILURE PREDICTION SOFTWARE

(75) Inventors: Scott Milton Fry, Oro Valley, AZ (US); Mark Edward Hill, Tucson, AZ (US); David Lee Swanson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1448 days.

(21) Appl. No.: 10/644,378

(22) Filed: Aug. 20, 2003

(65) Prior Publication Data

US 2005/0044451 A1 Feb. 24, 2005

(51) Int. Cl.
G06F 9/44 (2006.01)
G06N 7/02 (2006.01)
G06N 7/06 (2006.01)

(52) U.S. Cl. ........................................ 706/52
(58) Field of Classification Search ............. 706/3, 706/18, 17, 52, 4, 59, 47; 714/1, 25, 38; 707/2; 702/47, 56
See application file for complete search history.

(56) References Cited

U.S. PATENT DOCUMENTS

| | | | |
|---|---|---|---|
| 4,907,230 A * | 3/1990 | Heller et al. | 714/724 |
| 5,467,355 A | 11/1995 | Umeda et al. | 364/571.04 |
| 5,737,519 A | 4/1998 | Abdelnour et al. | 395/193.15 |
| 5,832,467 A * | 11/1998 | Wavish | 706/13 |
| 6,219,805 B1 * | 4/2001 | Jones et al. | 714/38 |
| 6,314,377 B1 * | 11/2001 | Ottesen et al. | 702/56 |
| 6,397,202 B1 * | 5/2002 | Higgins et al. | 706/47 |
| 6,446,081 B1 * | 9/2002 | Preston | 707/104.1 |
| 6,553,369 B1 * | 4/2003 | Guay et al. | 707/3 |
| 6,574,754 B1 | 6/2003 | Smith | 714/47 |
| 2002/0032544 A1 | 3/2002 | Reid et al. | 702/183 |
| 2002/0166082 A1 | 11/2002 | Ramadei et al. | 714/37 |
| 2003/0007268 A1 | 1/2003 | Smith | 360/31 |

OTHER PUBLICATIONS

'Application of AI tools in fault diagnosis of electrical machines and drives-an overview': Awadallah, Morcos, Jun. 2003, IEEE, 0885-8969/03, pp. 245-251.*

(Continued)

*Primary Examiner*—David R Vincent
*Assistant Examiner*—Peter Coughlan
(74) *Attorney, Agent, or Firm*—Kunzler & McKenzie

(57) ABSTRACT

An apparatus, system, and method are provided for developing failure prediction software for a storage system. The present invention allows a user to edit and revise a failure prediction algorithm that includes fuzzy logic rules. The failure prediction algorithm is generated in a human readable format and uses terms and operators familiar to experts in the field of storage systems. In addition, the present invention generates the machine-readable code necessary to implement or test a draft failure prediction algorithm. If the results of the failure prediction algorithm are unsatisfactory, the user may revise the failure prediction algorithm and re-run the tests until the results correspond to expected results. In addition, the present invention includes a performance monitor, processor, and determination module. The performance monitor gathers performance data for a storage system. The processor executes the failure prediction algorithm on the performance data to produce a result. The determination module selectively forecasts failure of one or more components of the storage system in response to the result.

33 Claims, 7 Drawing Sheets

OTHER PUBLICATIONS

'A Layer-Based Computational Model Plus A Data Base Structure As A Framework To Build Parallel Fuzzy Cotrollers': Andrade, 1998, IEEE, 0-7803-4316-6, pp. 165-173.*

'Fuzzy Guidance Controller for an Autonomous Boat': Vaneck, 1997, IEEE, 0272-1708/97, pp. 43-51.*

'Fuzzy Fundamentals': Cox, 1992, IEEE, 0018-9235/92, pp. 58-61.*

'Improved Disk-Drive Failure Warnings': Hughes, 2002, IEEE, 0018-9529/02, pp. 350-357.*

'Fixed-Time Life Tests Based On Fuzzy Life Characteristics': Kanagawa, 1992, IEEE, 0018-9529/92, pp. 317-320.*

'Fuzzy rule based expert system for power system fault diagnosis': Monsef, 1997, IEE Proc-Gener Transm Distrib vol. 144, No. 2 Mar. 1997.*

'Application of fuzzy logic to reliability engineering': Bowles, 1995, IEEE, 0018-9219, pp. 435-449.*

The MathWorks, Inc, "Fuzzy Logic Toolbox: Why Use Fuzzy Logic?" [Online] Jun. 24, 2003. URL http://www.mathworks.com/access/hlelpdesk/help/toolbox/fuzzy/fuzzyin2.shtml.

The MathWorks, Inc. "Fuzzy Logic Toolbox: Tutorial". [Online] Jun. 24, 2003. URL http://www.mathworks.com/access/helpdesk/help/toolbox/fuzzy/fuzzytu5.shtml.

Battelle Memorial Institute. "What is Fuzzy Logic?". [Online] Jun. 18, 2003. URL http://www.emsl.pnl.gov:2080/proj/neuron/fuzzy/what.html.

Fuzzy Tech. "Fuzzy Application Library/What is Fuzzy Logic?". [Online] Apr. 2, 2007. URL http://www.fuzzytech.com/e/what.html.

HyperLogic. "CubiCalc: An Interactive Shell for Using Fuzzy Rules". [Online] Apr. 2, 2007. URL http://hyperlogic.com/cbc.html.

Zadeh, L.A. "What is Fuzzy Logic and What Are Its Applications?". [Online] Apr. 2, 2007. URL http://buffy.eecs.berkley.edu/ResearchSummary/03abstracts/zadeh.13.html.

"Statistical Analysis and Reporting System User Guide," International Business Machines Corporation Nov. 29, 1999. Version 1.0, Chapter One.

* cited by examiner

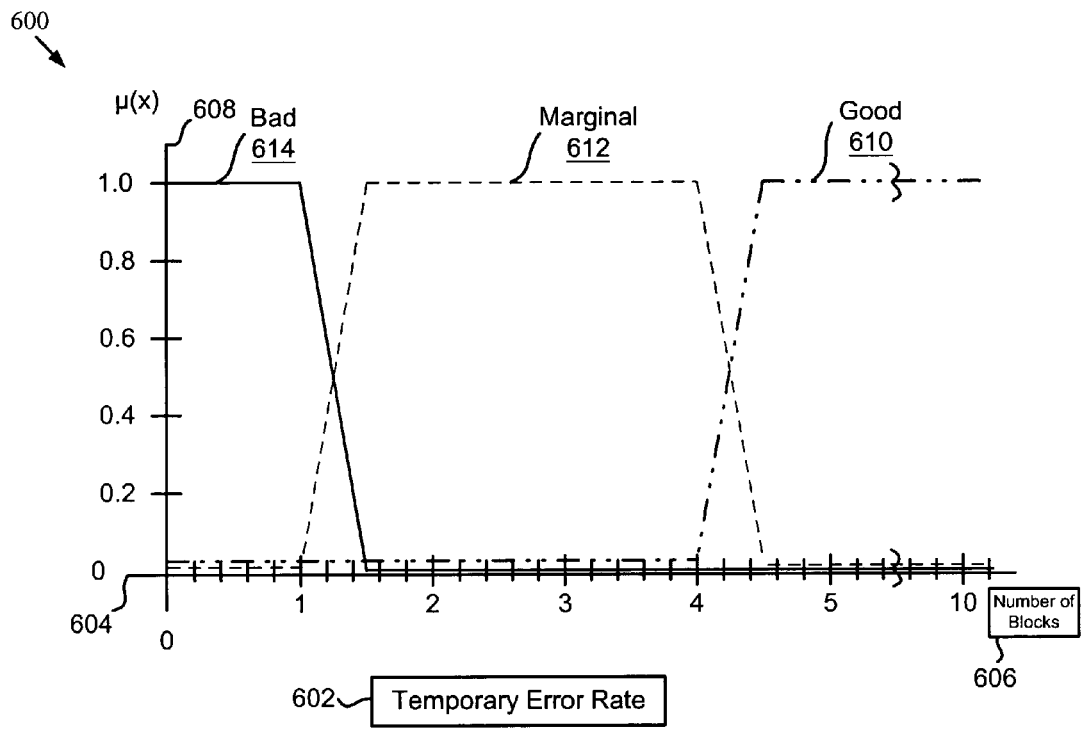

FIG. 6A

```
                                          ┌─624   ┌─618          ┌─622        ┌─620
616 ┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
    IF (temporary_error_rate IS bad)(AND)[datasets_written IS enough] THEN (mount_quality IS low)
616 └─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
    IF (temporary_error_rate IS NOT bad) AND (datasets_written IS enough) THEN (mount_quality IS high)
616
    IF (datasets_written IS NOT enough) AND (num_temp_errs IS too_many) THEN (mount_quality IS low)
616
    IF (datasets_written IS NOT enough) AND (num_temp_errs IS NOT too_many) THEN (mount_quality IS
       high)
                                    .
                                    .
                                    .
616
    IF (permanent_errors IS non_zero) THEN (mount_quality IS very_low)
```

FIG. 6B

APPARATUS, SYSTEM AND METHOD FOR DEVELOPING FAILURE PREDICTION SOFTWARE

BACKGROUND OF THE INVENTION

1. Field of the Invention

The invention relates to maintenance and storage of data within a storage system. Specifically, the invention relates to apparatus, systems, and methods for developing failure prediction software for a storage system.

2. Description of the Related Art

High density, removable media storage libraries are used to provide large quantities of storage in a computer system. Typically, such data storage systems are employed for backup or other secondary storage purposes, but may be used as primary storage in circumstances that are conducive to sequential data access and the like.

The data is stored on media cartridges, such as magnetic or optical disks, that are arranged in storage bins and accessed when data on a cartridge is requested. Generally, the data on a media cartridge is referred to as a volume. The data on a cartridge is accessed using a drive configured to read and write to the media of the cartridge. A data storage system may have many drives. Unfortunately, a drive or a media cartridge may fail, such that data is permanently lost. Such failure is typically caused by regular repeated use of the drive and the volume. For example, a tape library may include three drives and ten times that number of media cartridges. The media cartridges are repeatedly mounted and unmounted in the drives in response to various data storage transactions.

Failures of a drive or volume to properly perform are generally categorized as one of three types of errors. A soft error is one in which data is not properly read from or written to a storage media such as tape, but the error is correctable without affecting the data throughput in completing a data storage transaction. One example of a soft error is a write skip in which the writes data, reads the data back to verify accuracy, identifies a discrepancy, reverses direction, re-writes the same data which then is read back as accurately stored.

A temporary error is one in which data is lost, or an operation fails, but the error may be overcome using well-known recovery techniques performed by the data storage system. One example of a temporary error rate is when a block of data read from or written to a tape fails a Cyclic Redundancy Check (CRC). Such an error is typically recoverable but delays the data operation. A temporary error affects data throughput for the data storage transaction. For example, in response to a temporary error, a tape drive may stop advancing and reverse to allow for a second attempt at reading or writing to the storage media.

A permanent error or hard error is one in which data is lost, or an operation fails, and the data storage system is unable to recover the data or complete the operation as requested. One example of a permanent error is an attempt to read data from a portion of tape having a longitudinal crease. Permanent errors within a drive or volume may have serious consequences because data may be lost. Generally, soft errors are resolved by a media drive and are not reported. A media drive reports temporary errors and permanent errors to a host. Of course those of skill in the art are familiar with a host of other examples of soft errors, temporary errors, and permanent errors that may be tracked.

Generally, before a drive or volume experiences a permanent error, the drive or volume presents a trend of soft and temporary errors. This trend may, however, be sporadic. It is desirable to identify failing drives and volumes before one or more permanent errors occur by identifying these trends. Accordingly, performance data is collected for each drive and each volume. The performance data may be collected for each mount of a volume, for each transaction conducted on the drive, or for a combination of these over time. The performance data may include temporary errors such as the number of blocks successfully processed before the soft error. In addition, performance data may include a total number of soft errors for a given mount of a volume, or for the life of the drive.

Conventional data storage systems collect a large quantity of complex performance data. Software engineers have written complicated software to identify a failing drive or volume based on the performance data. Typically, this software uses as much performance data as possible to determine from past and present performance of a drive or volume whether the drive or volume will likely fail soon and cause a permanent error. Generally, the software includes a series of conditions defined by discrete threshold values. If the performance data crosses the threshold value, the software causes the data storage system to advise a user to service or replace the specific drive or volume.

Unfortunately, this conventional software has several limitations. First, the high number of input variables available within the performance data results in complicated software and routines that require an experienced software engineer to modify and refine. Consequently, those with the most experience with the data storage systems are not directly involved in developing algorithms to identify failing drives and volumes.

Second, discrete threshold values in conventional software often do not adequately reflect the relationship between different values in the performance data. Because of the many different operating conditions a data storage system may experience, a discrete threshold does not necessarily mean a direct cause and effect relationship between the performance data and imminent failure of the drive or volume. Other factors, such as unusually high performance demands, may cause performance data to cross discrete thresholds. Consequently, the conventional software reports costly false-positives, reporting that a drive or a volume should be repaired or replaced, when the drive or volume is in fact in satisfactory condition.

Third, the conventional software includes predefined thresholds that determine when repair or replacement is advised. Certain end-users may desire that the software be more sensitive to the risk of data loss. Currently, an end-user is unable to balance the risk of losing data due to a permanent failure of a drive or a volume against the costs of following the advised repair or replacement the drive or the volume.

Fourth, the conventional software includes a rigid, prolonged development cycle. The software is typically implemented in microcode of a drive or a sub-system of the data storage system by software engineers who lack the extensive experience of those involved in the day-to-day operations of data storage systems. Modification of the software typically requires changing the programming code, compiling the programming code into microcode, uploading the microcode, and testing of the microcode on a drive or in an a physical test environment using a battery of tests. If the software fails to perform as expected, this time-consuming modification process must be repeated.

Thus, it would be an advancement in the art to provide an apparatus, system, and method for developing failure prediction algorithms in which those most experienced with data storage system drives and volumes directly may contribute to designing and drafting of failure prediction algorithms. In addition, it would be an advancement in the art to provide an apparatus, system, and method that accommodates imprecision inherent in forecasting failure of drives or volumes of a data storage system. It would be a further advancement in the art to provide an apparatus, system, and method that allows an end-user to adjust the sensitivity of the failure prediction algorithm according to the amount of risk of data loss the end-user is willing to bear. Furthermore, it would be an advancement in the art to provide an apparatus, system, and method that shortens the development cycle for a failure prediction algorithm and facilitates the testing of failure prediction algorithms developed. Such an apparatus, system, and method are provided herein.

BRIEF SUMMARY OF THE INVENTION

The present invention has been developed in response to the present state of the art, and in particular, in response to the problems and needs in the art that have not yet been fully solved by currently available failure prediction software. Accordingly, the present invention has been developed to provide a system, apparatus, and method for developing failure prediction software for a storage system that overcomes many or all of the above-discussed shortcomings in the art.

An apparatus for developing failure prediction software for a storage system includes an editor. The editor allows a user to generate a failure prediction algorithm using fuzzy logic rules. The fuzzy logic rules use linguistic variables that are well-known to experts for storage systems and preferably include two to four terms. The editor allows the failure prediction algorithm to be written and modified in a human readable format.

The apparatus also includes a code generator that generates machine-readable code from the stored failure prediction algorithm. The code generator may generate microcode, code for a particular programming language such as C, assembly code, or the like. A test module of the apparatus tests the machine-readable code with sample data to produce a result. If the result is different from an expected result given the set of sample data, a revision module allows a user to revise the failure prediction con algorithm such that the result corresponds to the expected result.

In certain embodiments, the test module allows a user to tune the failure prediction algorithm by adjusting a user-adjustable quality threshold. The user-adjustable quality threshold may comprise data values that are editable by the user.

In one embodiment, an apparatus for predicting component failure within a storage system is provided. The apparatus includes a performance monitor configured to gather performance data for a storage system. A processor of the apparatus executes a failure prediction algorithm on the performance data to produce a result. The failure prediction algorithm preferably comprises fuzzy logic rules. A determination module selectively forecasts failure of one or more components of the storage system in response to the result.

In another embodiment, the apparatus includes an interface that allows a user to adjust a predefined quality threshold for a component of the storage system to tune the failure prediction algorithm. In one embodiment, the user is allowed to change the sensitivity of the failure prediction algorithm to specific performance data.

A system of the present invention is also presented for predicting component failure within a storage system. In particular, the system, in one embodiment, includes a communication module, a drive mechanism, a controller, and an analysis module. The communication module exchanges data between a host and a storage media. The storage media is mounted in a drive mechanism configured to read and write data to the storage media. The controller controls and manages data transactions between the host and the drive mechanism. The analysis module executes machine-readable code programmed to selectively predict failure of the storage media and the drive mechanism in response to a result from a failure prediction algorithm. The failure prediction algorithm comprises fuzzy logic rules and performance data associated with the storage media and the drive mechanism.

A process of the present invention is also presented for developing failure prediction software for a storage system. In one embodiment, the process includes generating a failure prediction algorithm that utilizes fuzzy logic rules. The failure prediction algorithm is preferably presented and stored in a human-readable format. Next, machine-readable code is generated from the stored failure prediction algorithm. Then, the machine-readable code is tested to produce a result. Finally, the failure prediction algorithm is revised such that the result corresponds to an expected result.

In certain embodiments, the fuzzy logic rules comprise linguistic variables having less than four terms. Preferably, the linguistic variables comprise between about two and three terms. A low number of terms reduces the number and complexity of the fuzzy logic rules. As needed, fuzzy logic rules may be added to the failure prediction algorithm to improve the effectiveness of the failure prediction algorithm.

The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 6A is a graph illustrating a fuzzy logic membership function for a representative fuzzy logic variable suitable for one embodiment of the present invention;

FIG. 6B is a listing of representative fuzzy logic rules in accordance with one embodiment of the present invention.

DETAILED DESCRIPTION OF THE INVENTION

Figure 1:
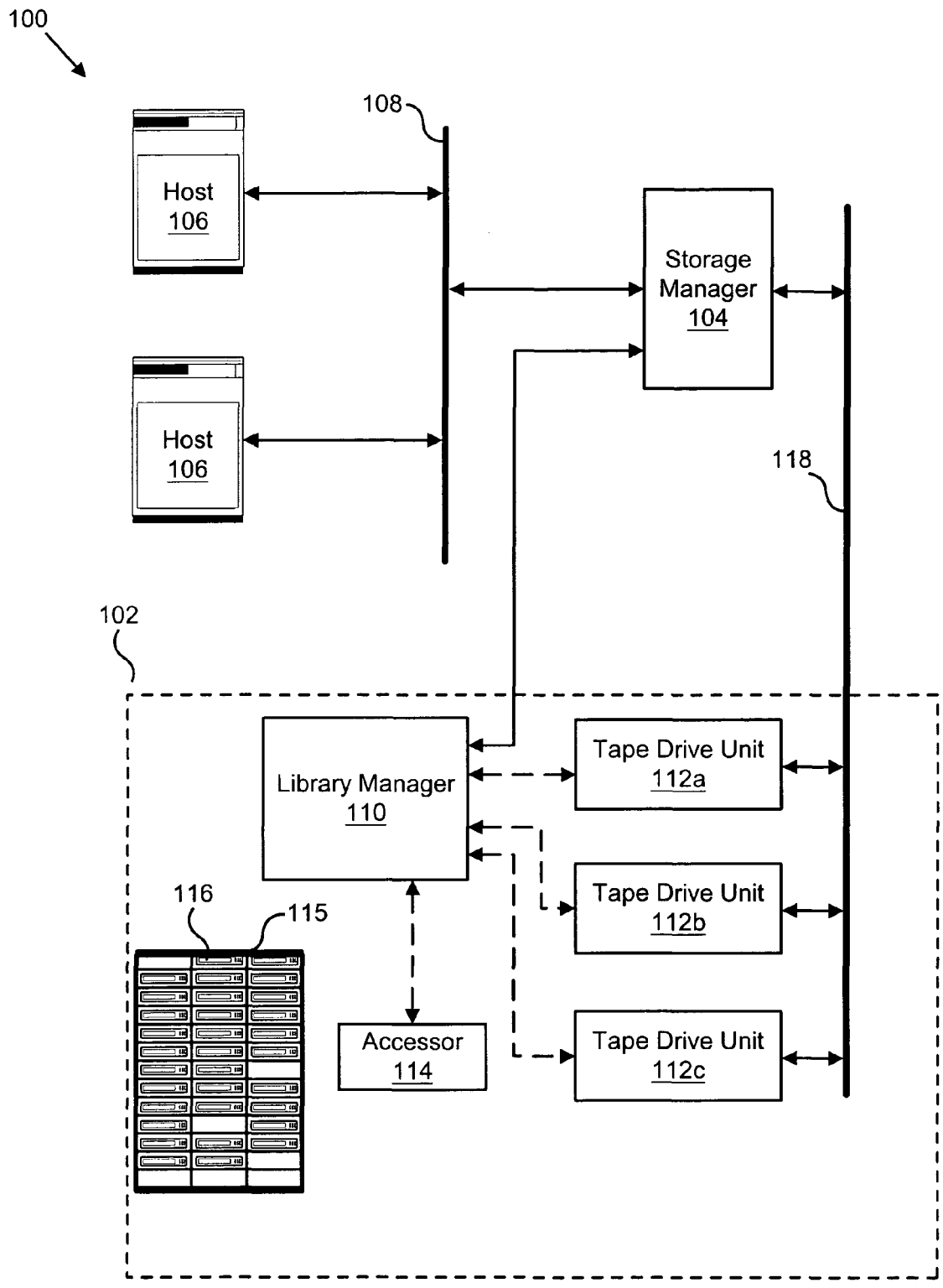
FIG. 1 is a schematic block diagram illustrating one embodiment of a representative data storage system suitable for implementing the present invention.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1 through 7, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

FIG. 1 illustrates a schematic block diagram of one embodiment of a representative storage system 100 in accordance with the present invention. The system 100 includes an automated library unit 102, at least one storage manager 104, and at least one host 106. Each host 106 may be a mainframe computer. Alternatively, the hosts 106 may be servers or personal computers using a variety of operating systems. The host 106 and the storage manager 104 are connected via a storage area network (SAN) 108 or similar communications channel.

The automated tape library unit 102 includes a library manager 110, one or more data drive devices, which may be tape drive units 112, an accessor 114, and a plurality of media cartridges 116 (referred to hereinafter interchangeably as a media cartridge, media, and a tape). The plurality of media cartridges 116 may be stored in one or more media cartridge storage bins 115. While the present invention is described herein in relation to specific media storage devices and cartridges, tape drives 112 and tapes 116, those of skill in the art will recognize that the invention may readily be implemented with other removable storage devices and media such as optical discs.

The library manager 110, which includes at least one computing processor, is interconnected with, and controls the actions of, the tape drive units 112 and the accessor 114. The library manager 110 typically also includes one or more hard disk drives (not shown) for memory storage, as well as a control panel or keyboard (not shown) to provide user input. The control panel may be a computer in communication with the library manager 110 so that a user can control the operating parameters of the automated tape library unit 102 independently of the host 106.

In FIG. 1, three tape drive units 112a, 112b, and 112c are shown. The present invention is operable with one or any larger number of tape drive units 112. The tape drive units 112 may share one single repository of cartridges 116. Alternatively, the tape drive units 112 may independently correspond to and utilize multiple repositories of cartridges 116. The tape drive units 112 may advantageously be distributed over multiple locations to decrease the probability that multiple tape drive units 112 will be incapacitated by a disaster in one location.

The interconnections between the library manager 110, the tape drive units 112, and the accessor 114 are shown as dashed lines to indicate that the library manager 110 transmits and receives control signals, rather than data to be stored or retrieved, to the tape drive units 112 and/or the accessor 114. Data for storage or retrieval may instead be transmitted directly between the storage manager 104 and the tape drive units 112 via a network 118, which may be a storage area network (SAN), a local area network (LAN), wide area network (WAN), or a different type of network, such as the Internet or a direct connection between the storage manager 104 and the tape drive units 112.

The accessor 114 may be a robotic arm or other mechanical device configured to transport a selected cartridge 116 between a storage bin 115 and a tape drive unit 112. The accessor 114 typically includes a cartridge gripper and a bar code scanner (not shown), or similar read system, mounted on the gripper. The bar code scanner is used to read a volume serial number (VOLSER) printed on a cartridge label affixed to the cartridge 116. In alternative embodiments, the tape drive units 112 may be replaced by optical disk drives or other magnetic drives. Similarly, the cartridges 116 may contain magnetic media, optical media, or any other removable media corresponding to the type of drive employed.

As mentioned above, it is desirable to gather performance data regarding the operation of the tape drive units 112 and each cartridge 116. Preferably, sufficient performance data is gathered to allow an algorithm, or software module, to reliably predict permanent failure of a tape drive unit 112 or a cartridge 116. The algorithm for predicting failure of a tape drive unit 112 or cartridge 116 may execute on a processor of the library manager 110, a controller (not shown) of the tape drive unit 112, or a processor of the storage manager 104.

Conventionally, development and deployment of these failure prediction algorithms is lengthy. A software engineer writes the algorithm in a programming language, such as C, to use performance data as inputs. The algorithm may include cryptic variables and conditions. Next, the algorithm is converted into machine code specifically tailored for the processor that will execute the algorithm. For example, the machine code may be formatted and organized specifically for a microcontroller of a tape drive unit 112. The machine code is uploaded into the tape drive unit 112 and tested by, for example, operating the automated library unit 102. If the test results are different than those expected, the development process is repeated until more satisfactory results are achieved. This development process involves significant time and resources.

Figure 2:
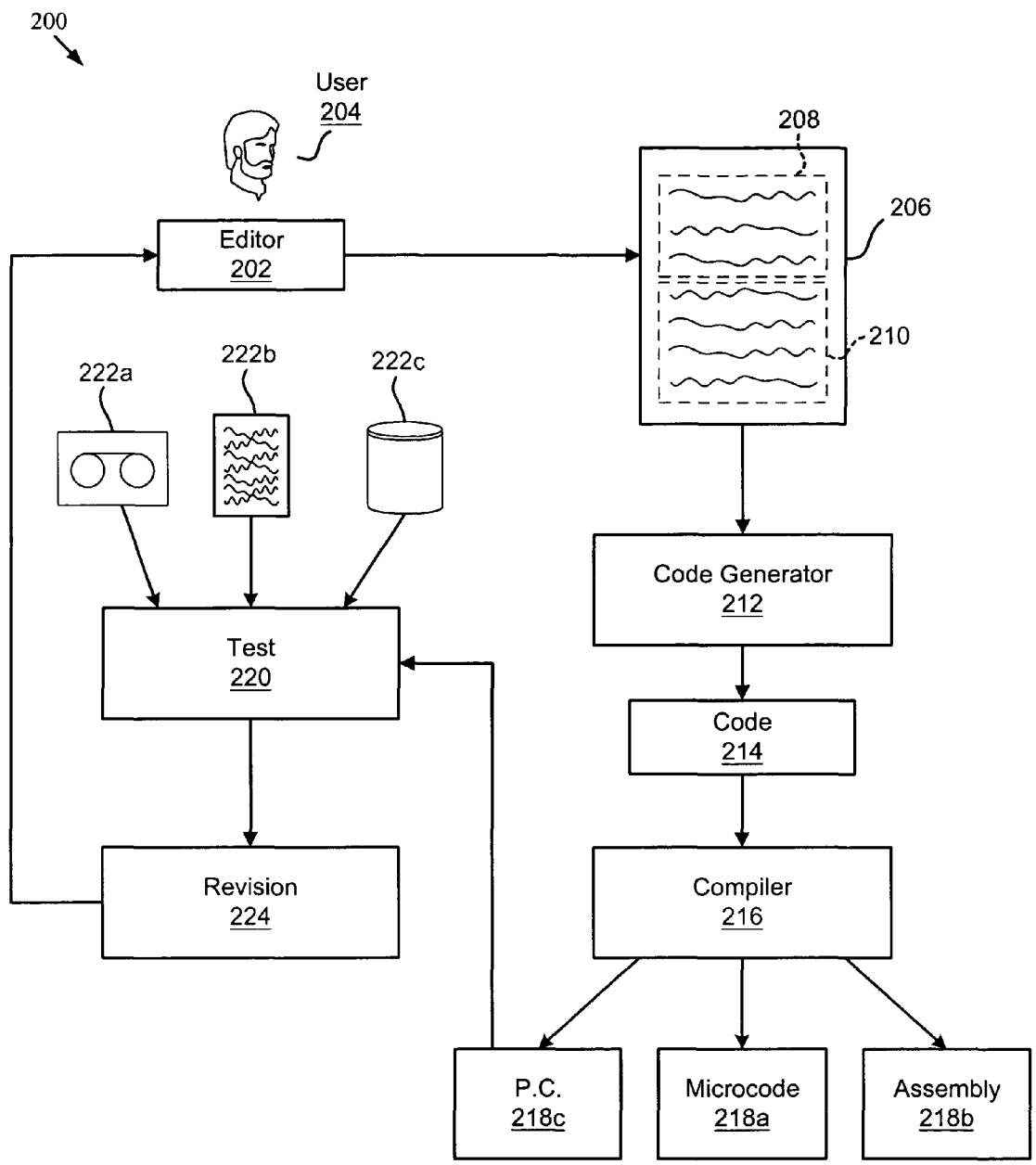
FIG. 2 is a block diagram illustrating one embodiment of an apparatus in accordance with the present invention.

FIG. 2 illustrates an apparatus 200 for developing failure prediction software to overcome limitations of conventional apparatus, systems, and methods. Specifically, the apparatus 200 facilitates development of a failure prediction algorithm for operation within a media drive unit 112.

The apparatus 200 includes an editor 202 configured to allow a user 204 to generate a failure prediction algorithm 206. In one embodiment, the editor 202 is any conventional text editor such as a word processor. Alternatively, or in addition, the editor 202 may comprise a software application designed specifically for creating and modifying a failure prediction algorithm 206. The one or more users 204 may use the editor 202 to create a failure prediction algorithm 206 from scratch or to revise a preloaded template having predefined fuzzy variables. In one embodiment, the editor 202 includes a plurality of aides such as help files, tutorials, and fuzzy rule development guides that assist the user in designing the failure prediction algorithm 206.

In one embodiment, the failure prediction algorithm 206 includes fuzzy variables 208 and fuzzy logic rules 210. The fuzzy variables 208 allow performance data to be represented by imprecise fuzzy sets. One or more fuzzy logic rules 210 are evaluated to produce an output for the failure prediction algorithm 206. Preferably, additional fuzzy logic rules 210 may be added without reorganizing the failure prediction algorithm 206.

Preferably, the editor 202 allows a user 204 to draft fuzzy logic rules (defined in more detail below) using fuzzy variables 208 and other terminology commonly used by the user 204 in analyzing and working with tape drives 112 and media 116. The editor 202 allows a user to combine a limited set of operators in simple conditional statements that employ variables regarding tape drive 112 and media 116 performance. Preferably, the fuzzy logic rules include almost no symbols such that each fuzzy logic rule reads as a common human-readable sentence. Preferably, the set of operators is limited such that the fuzzy logic rules are simple and readily understandable.

The user 204 preferably interfaces with the editor 202 using a conventional monitor, mouse, and keyboard (not shown). Once the failure prediction algorithm 206 is drafted, the editor 202 outputs the failure prediction algorithm 206 in a human-readable format. Preferably, the output format corresponds to the format used to display the failure prediction algorithm 206 within the editor 202. The editor 202 saves the failure prediction algorithm 206 on a hard drive. In addition, the editor 202 may print a hard copy of the failure prediction algorithm 206. In one embodiment, the failure prediction algorithm 206 is stored in a conventional ASCII text file format. The text file or hard copy version of the failure prediction algorithm 206 may be discussed and reviewed by a plurality of users 204 for accuracy and completeness. The text file may be loaded into any conventional text editor.

In certain embodiments, the editor 202 checks the failure prediction algorithm 206 for proper syntax prior to saving the failure prediction algorithm 206 to disk. Preferably, syntactic elements used in the failure prediction algorithm 206 are minimal. The editor 202 may also check for basic semantic compliance, such as conditionals which have both an antecedent and a consequent.

The apparatus 200 includes a code generator 212 configured to generate machine-readable code from the stored failure prediction algorithm 206. The code generator 212 is preferably a software module configured to load a text file comprising the failure prediction algorithm 206. The code generator 212 parses the text file and converts the fuzzy variables 208 and fuzzy logic rules 210 of the failure prediction algorithm 206 into corresponding variables, constructs, and routines in one or more source code files 214. In one embodiment, the source code 214 is stored.

The source code files 214 comprise the instructions required for a processor to execute the failure prediction algorithm 206. Preferably, the source code 214 is organized and formatted in accordance with a computer programming language such as C, C++, Visual Basic, or the like. Preferably, the source code 214 includes no calls to proprietary routines available within a particular operating system or processor. Typically, a failure prediction algorithm 206 of a few lines results in source code 214 having one hundred or more lines. The source code 214 is readily understandable to a computer programmer, though a user 204 who is not an experienced programmer may have difficulty analyzing the logic of a failure prediction algorithm 206 using the source code 214.

The compiler 216 converts the source code into machine-readable code (also referred to as machine code) 218. The machine code 218 is a series of machine instructions which implement the failure prediction algorithm 206. In certain embodiments, a linker (not shown) combines the machine code 218 for the failure prediction algorithm 206 with other machine code suitable to enable use of the failure prediction algorithm 206 in an intended application.

Typically, the compiler 216 produces a single set of machine code 218 for execution on a predefined processor or computer environment, referred to hereinafter as a target platform. For example, the target platform may be a processor for a tape drive unit 112 of a data storage system. Consequently, the compiler 216 produces machine code 218*a* organized as microcode for the tape drive 112. Of course, the microcode may be specific to any storage system, subsystem, or processor. For instance, if the target platform is assembly language for a specific processor, the compiler produces appropriate machine code 218*b*. Alternatively, if the target platform is a PC or a workstation, the machine code 218*c* produced is organized and configured to function properly on the PC.

Selection of a target platform for the machine code 218 depends on the stage of development for the failure prediction algorithm 206. If the development stage is early and the failure prediction algorithm 206 needs to be tested, a PC may be selected as the target platform. The machine code 218*c* may be combined with other machine code implementing a test module 220 configured to execute on a PC.

The test module 220 allows the machine code 218c to be tested on a conventional PC prior to uploading microcode to a tape drive unit 112. In this manner, the testing process is less time consuming and expensive, particularly when development of the failure prediction algorithm 206 is in the early stages.

The test module 220 tests operation of the failure prediction algorithm 206 using sample data 222. The sample data 222 comprises performance data for a tape drive 112 or a media cartridge 116. The sample data 222 may be actual data 222a from an existing tape drive 112 or a media cartridge 116. Alternatively, the sample data 222b may originate from a test script written by a user 204 or computer programmer. In yet another alternative, the sample data 222c may originate from a database that stores a plurality of sample data sets either hypothetical or generated through customer use of a tape drive 112 or media cartridge 116.

The test module 220 produces a result. Typically, the result is a quality determination for either a tape drive 112, a media cartridge 116, or both. Typically, if the quality determination falls below a predetermined threshold replacement or repair of a tape drive 112 or media cartridge 116 is advised.

In a preferred embodiment, the user 204 reviews the results of the test module 220 and determines whether the results correspond to an expected result given the specific sample data. If the results correspond to those expected by the user 204, typically an expert in the field of data storage devices, the test module 220 may test the failure prediction algorithm 206 again using different sample data 222. This cycle may continue until the user 204 is confident that the failure prediction algorithm 206 will perform properly.

If the results are different, a revision module 224 allows the user 204 to revise the failure prediction algorithm 206 until the results correspond to the results expected by the user 204. In one embodiment, the revision module 224 comprises the ability of the editor 202 to load a text file comprising the failure prediction algorithm 206. The user 204 is able to modify the predefined failure prediction algorithm 206 and re-run the test using the components described above. Alternatively, the revision module 224 may comprise any simple text editor.

The apparatus 200 allows a failure prediction algorithm 206 to be drafted or revised and tested iteratively by a non-programmer until the results of the failure prediction algorithm 206 correspond to those expected by a user 204. The user 204 is preferably an expert in the field of data storage technologies. As used herein, expert means personnel who have been trained to manage and identify data storage devices or media cartridges that are degraded to a point that permanent failure (a permanent error) is imminent. The expert may have special training as well as on-the-job experience which allow the expert to weigh a plurality of imprecise variables in identifying whether a drive 112 or cartridge 116 is failing.

One aspect of the present invention allows the expertise of the experts to be easily captured in a fuzzy logic system that more accurately anticipates permanent failure within a storage system. The expert does not require the assistance of a software engineer to implement the fuzzy logic system. Preferably, the failure prediction algorithm 206 allows fuzzy logic rules 210 to be added without reorganizing the failure prediction algorithm 206.

Figure 3:
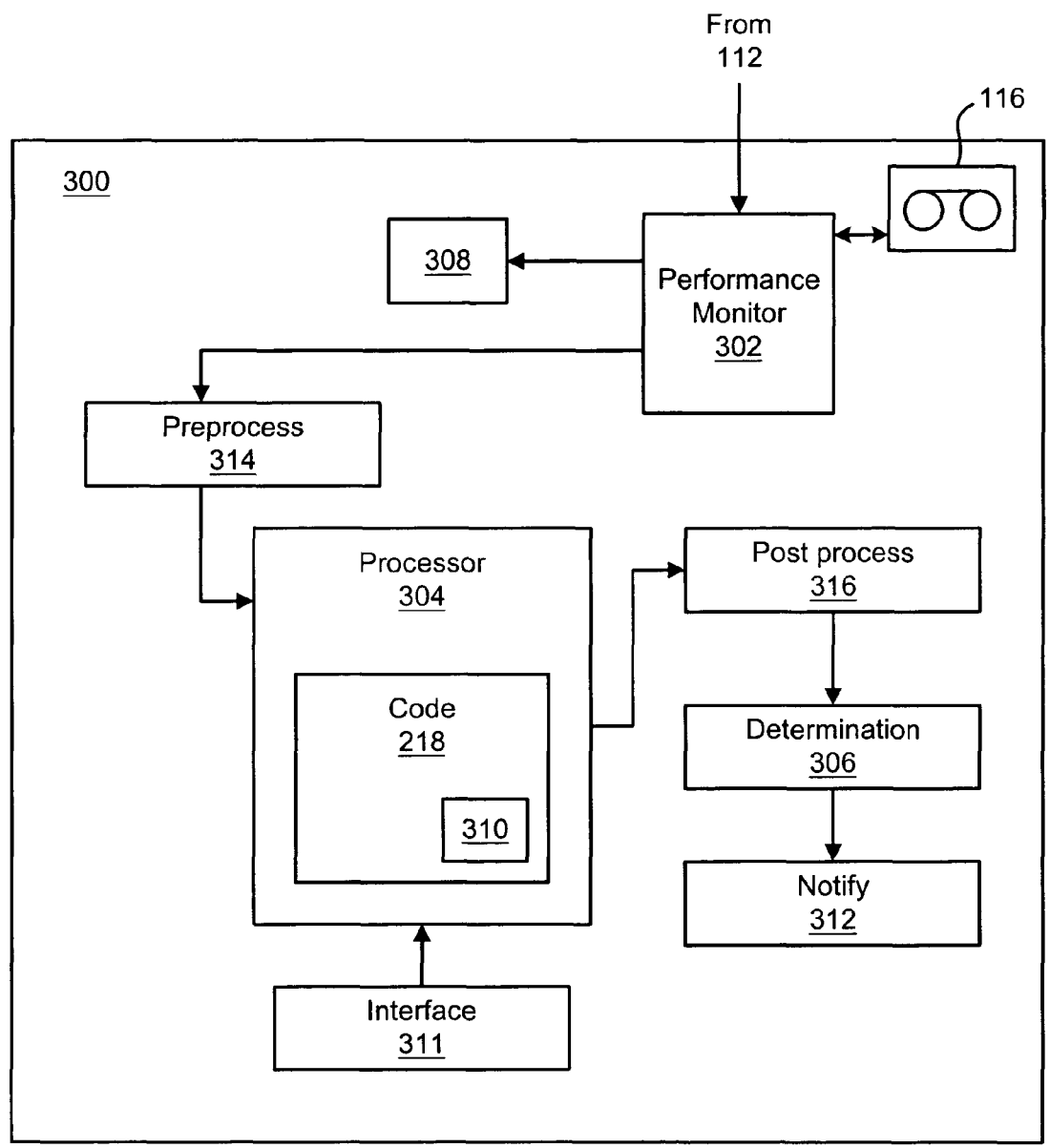
FIG. 3 is a block diagram illustrating one embodiment of another apparatus in accordance with the present invention.

FIG. 3 illustrates an apparatus 300 for predicting component failure within a storage system. The apparatus 300 includes a performance monitor 302, a processor 304, and a determination module 306. The performance monitor 302 gathers performance data generated as a result of the operation of a tape drive 112 that interacts with one or more media cartridges 116. The performance monitor 302 interacts with a plurality of sensors and other well known modules to identify and collect the performance data.

For example, the performance monitor 302 may communicate with a read/write head of a tape drive 112. The read/write head may signal when a write operation was unsuccessful. If the problem is resolved by a successive write attempt, the performance monitor 302 may register a soft error. As mentioned above, such an error may be recorded as performance data but not reported to a module or application outside of the tape drive 112.

Performance data may be gathered for a variety of characteristics of a tape drive unit 112 and a media cartridge 116. Those of skill in the art will recognize the various characteristics and granularity of performance data that may be gathered over time, per transaction, or per mount of a given cartridge 116 on a given tape drive unit 112. In one aspect of the present invention, performance data is gathered during each mount of a tape drive.

Once a tape is unloaded, or unmounted, the performance monitor 302 stores the performance data. In one embodiment, performance data specific to a particular tape 116 is written on the tape in a space designated for this purpose. Performance data specific to the tape drive 112 may be stored in a static memory device 308 within the tape drive 112. The memory device 308 may preserve stored data even if the tape drive 112 is powered off. Alternatively, or in addition, performance data for a tape 116 and/or tape drive 112 may be stored in a database (not shown).

In one embodiment, the performance data is provided to the processor 304. The processor 304 executes a failure prediction algorithm 310 that uses the performance data for one or more input variables. The failure prediction algorithm 310 includes fuzzy logic rules. Preferably, the failure prediction algorithm 310 is implemented in machine-readable code 218 executable on the processor 304. In one representative example, the failure prediction algorithm 310 is implemented in microcode 218a.

In one embodiment, the machine-readable code 218 is executed in response to the unmounting of a tape 116. Alternatively, other commands or events may initiate execution of the machine-readable code 218. For example, a user command may initiate execution of the failure prediction algorithm 310.

Execution of the failure prediction algorithm 310 produces a result which is provided to the determination module 306. The determination module 306 makes a determination using the result about whether the tape drive 112 or tape 116 is likely to experience a failure, for example a permanent failure, in the near future, e.g. during one of the next few tape mounts.

In one aspect of the present invention, the result represents the condition, or quality, of the tape drive 112 and tape 116. The result may comprise a tape drive quality value and a tape quality value. These values may be expressed as a percentage of performance capability. Typically, the quality value corresponds to a probability that the tape 116 or tape drive 112 will operate free of any permanent errors on the next successive tape mount. For example, the result may indicate a tape 116 having an eighty-five percent quality rating. Such a quality rating may be interpreted to mean that there is an eighty-five percent chance that the tape 116 will perform without a permanent error on the next tape mount and that there is a fifteen percent chance the tape 116 will experience a permanent error possibly resulting in data loss.

In one embodiment, the determination module 306 maps the result to one of a plurality of predefined recommendations. The determination module 306 may look up an appropriate predefined recommendation based on the tape drive 112 quality and/or tape 116 quality. Typically, the predefined recommendations correspond to ranges of tape drive 112 quality and/or tape 116 quality. For example, if the tape 116 quality value is between about twenty to about thirty percent, the predefined recommendation provided by the determination module 306 may advise a user to replace the tape 1116. Other predefined recommendations may include advising specific diagnostic tests for a tape 116 or drive 112, advising that a drive 112 be serviced, advising that a tape be designated read-only, advising that a drive 112 be taken off-line, and the like. The predefined recommendation comprises a forecast regarding the probability of impending failure of a tape drive 112 and/or tape 116.

In certain embodiments, the ranges that define how a quality value maps to predefined recommendation are referred to as quality thresholds. Typically, the quality thresholds are set by a manufacturer and are based on extensive research as to the proper predefined recommendation for a given quality threshold. In one embodiment, an interface 311 enables a user to adjust the quality thresholds that map to predefined recommendations. Typically, certain predefined recommendations motivate a user of the apparatus 300 to take a remedial action. These remedial actions incur a certain cost. The cost may be in down time, data migration costs, labor costs, or actual costs for replacement parts or even a tape drive 112 and/or tape 116.

The interface 311 allows a user to balance a risk of data loss against the costs of taking remedial action. The interface 311 may be simple or complex. In a simple interface 311 the user is able to set values stored in memory (not shown) of the apparatus 300 that define the quality thresholds. In certain embodiments, a user may simply edit a configuration file.

The interface 311 allows a user to set one or more quality thresholds high or low depending on the user's priorities of minimizing repair and other remedial costs and minimizing the risk of data loss. For certain predefined recommendations such as "migrate data to a new tape and replace tape," a user may set the quality threshold very low such that this recommendation is not made until the tape experiences temporary errors such that the failure prediction algorithm produces a tape quality that is below the quality threshold. In this manner, tapes 116 are replaced less frequently, reducing costs. The risk of losing data, however, is higher because a tape may experience a permanent error before the failure prediction algorithm produces a tape quality that is below the quality threshold.

The determination module 306 may communicate the applicable predefined recommendation to a notification module 312. The notification module 312 sends the predefined recommendation to a host application or user. Depending on the severity of the predefined recommend, a user or application may choose to follow the advised recommendation or not.

The depicted apparatus includes a preprocess module 314 and a post process module 316. Preferably, the performance monitor collects historical performance data for a specific tape 116 on a specific drive 112 for a certain number of mounts, e.g., one hundred. In certain embodiments, the fuzzy logic rules 210 operate on distinct parameter values instead of a series of data values for the same statistic. The preprocess module 314 combines a number of performance data in a predefined manner such that the number of input variables used in the fuzzy logic rules 210 is minimized. For example, the preprocess module 314 may compute an average number of temporary errors for a tape 116. This average then becomes one of a plurality of input variables for the failure prediction algorithm 310.

Similarly, in certain embodiments, the post process module 316 evaluates output variables from the processor 304 and computes other values that may be more suitable for use by the determination module 306. For example, the failure prediction algorithm 310 may compute a read quality and a write quality for a tape 116. The post process module 316 may compute a mount quality value that comprises the weighted average of the read quality and the write quality. Of course, those of skill in the art will recognize that a variety of additional functions may be performed by the preprocess module 314 or the post process module 316. Preferably, functionality requiring more significant mathematic operations such as averages and aggregating performance data are reserved for the preprocess module 314 and the post process module 316.

Figure 4:
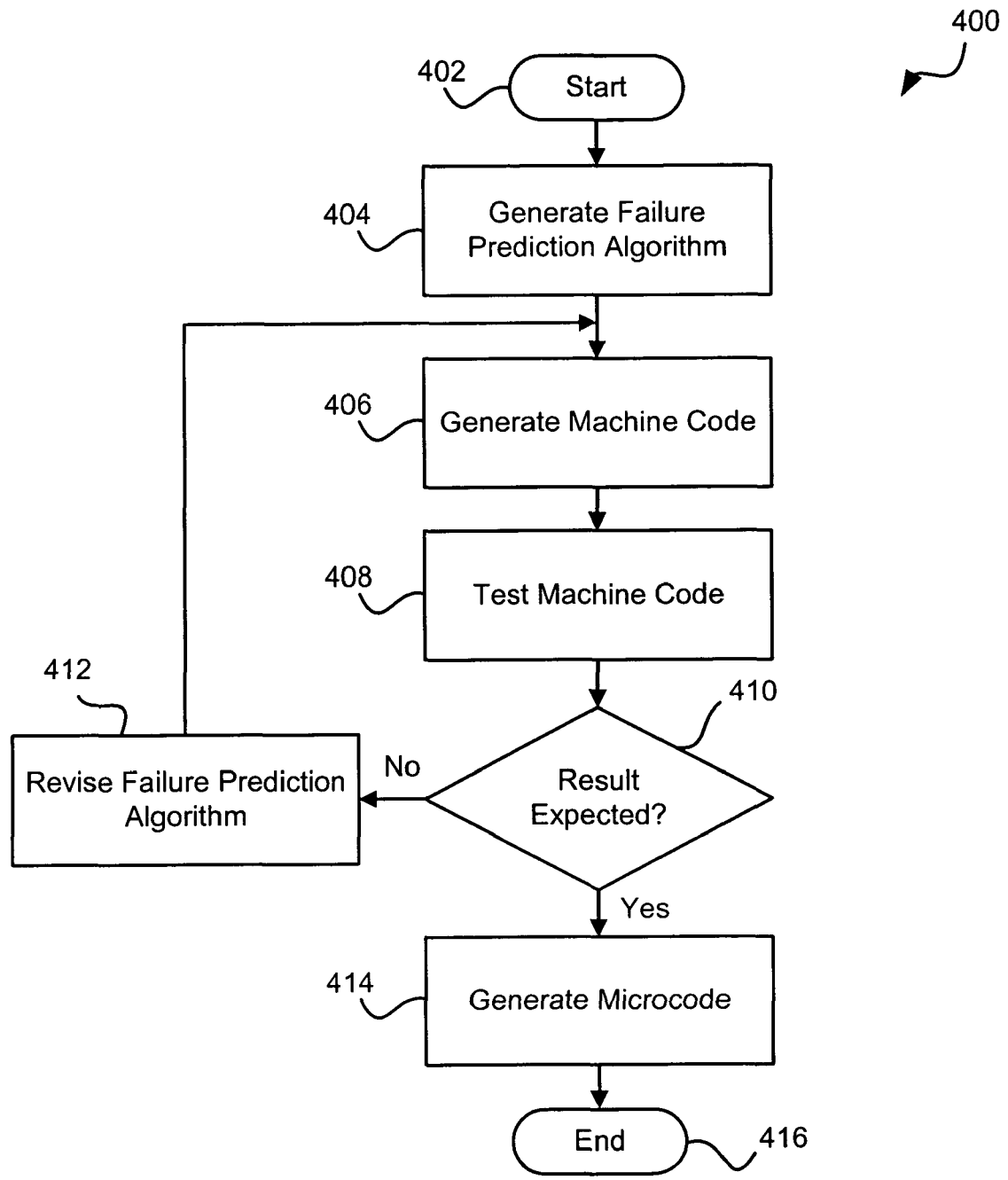
FIG. 4 is a schematic flow chart diagram illustrating a method for developing failure prediction software for a storage system.

FIG. 4 illustrates a method 400 for developing failure prediction software for a storage system. The method 400 starts 402 by generating 404 a failure prediction algorithm 206. As mentioned above, the failure prediction algorithm 206 is preferably drafted in a human-readable format such as text. In addition, the failure prediction algorithm 206 may be stored in a human-readable format. In one embodiment, the failure prediction algorithm 206 is defined by drafting fuzzy logic rules that operate on fuzzy logic variables.

Preferably, the fuzzy logic variables accurately reflect the terminology, including subjects, verbs and adjectives, that are familiar to those of skill in the field of storage systems. Specifically, the failure prediction algorithm 206 comprises simple conditional statements (described in more detail below) that include a minimal number of symbols and read as complete sentences. Consequently, the failure prediction algorithm 206 may be drafted by personnel who work day to day with a storage system the failure prediction algorithm is intended to analyze. Alternatively, or in addition, the personnel may comprise field engineers, repair technicians, and others familiar with storage systems but who may not have software engineering or computer programming expertise.

Next, machine-readable code is generated 406 from the stored failure prediction algorithm 206. As mentioned above, machine-readable code generation may involve creating software source code in a language such as C or C++ that is compiled into machine code. Preferably, the method 400 is intended to allow for development of the failure prediction algorithm 206 to proceed on as rapid of a development cycle as possible. Consequently, during initial development, the machine code generated may be tailored to a testing environment that allows for quick setup and testing. In one embodiment, the machine code is targeted for operation with supporting code in a testing environment configured to operate on a conventional PC or workstation.

The machine code is tested 408 on the desired target platform to produce a result. As mentioned above, the machine code may be tested with sample data 222 from a variety of sources. A single test may be run on the failure prediction algorithm, or a plurality of tests may be run.

The result of the tests may include a drive quality and a mount quality. The result may also indicate what predefined recommendation would be made based on these quality determinations. In certain embodiments, the same personnel that drafted the failure prediction algorithm 206 may review the result produced by the tests. These personnel may be experts in the field of data storage and draw upon their training and experience to determine 410 whether the test result corresponds to an expected result for the given test data.

Typically, during initial development of a failure prediction algorithm 206 the test result will not correspond to the expected result. For example, the failure prediction algorithm 206 may produce an unacceptable number of false positives, recommending replacement or repair when in fact such action is not warranted.

Consequently, if the test result does not correspond to the expected result, the failure prediction algorithm 206 is revised 412. In certain embodiments, the same team of personnel used to generate and test the failure prediction algorithm may not edit and revise the failure prediction algorithm 206. Preferably, the failure prediction algorithm 206 is revised using a simple text editor, and no special editing software is required. Revisions to the failure prediction algorithm 206 may include changing the conditional statements of the fuzzy logic rules, drafting additional or replacement fuzzy logic rules, drafting new fuzzy variables, or the like.

Once the failure prediction algorithm 206 is revised to the satisfaction of the drafting personnel, the method 400 is repeated to produce a new result using the revised failure prediction algorithm 206. The development cycle may be repeated rapidly, because all of the development and testing may be done on a single machine such as a PC or workstation.

If the test result corresponds to an expected result, microcode is generated 414 for a specific hardware controller of the storage system and the method ends 416. For example, the microcode may be compiled, as discussed above, from generic ANSI C code that includes no operating system specific functionality to microcode for a controller or a tape drive 112. The microcode may be combined with other microcode for the tape drive 112 by a linker (not shown) and uploaded into a tape drive 112.

Figure 5:
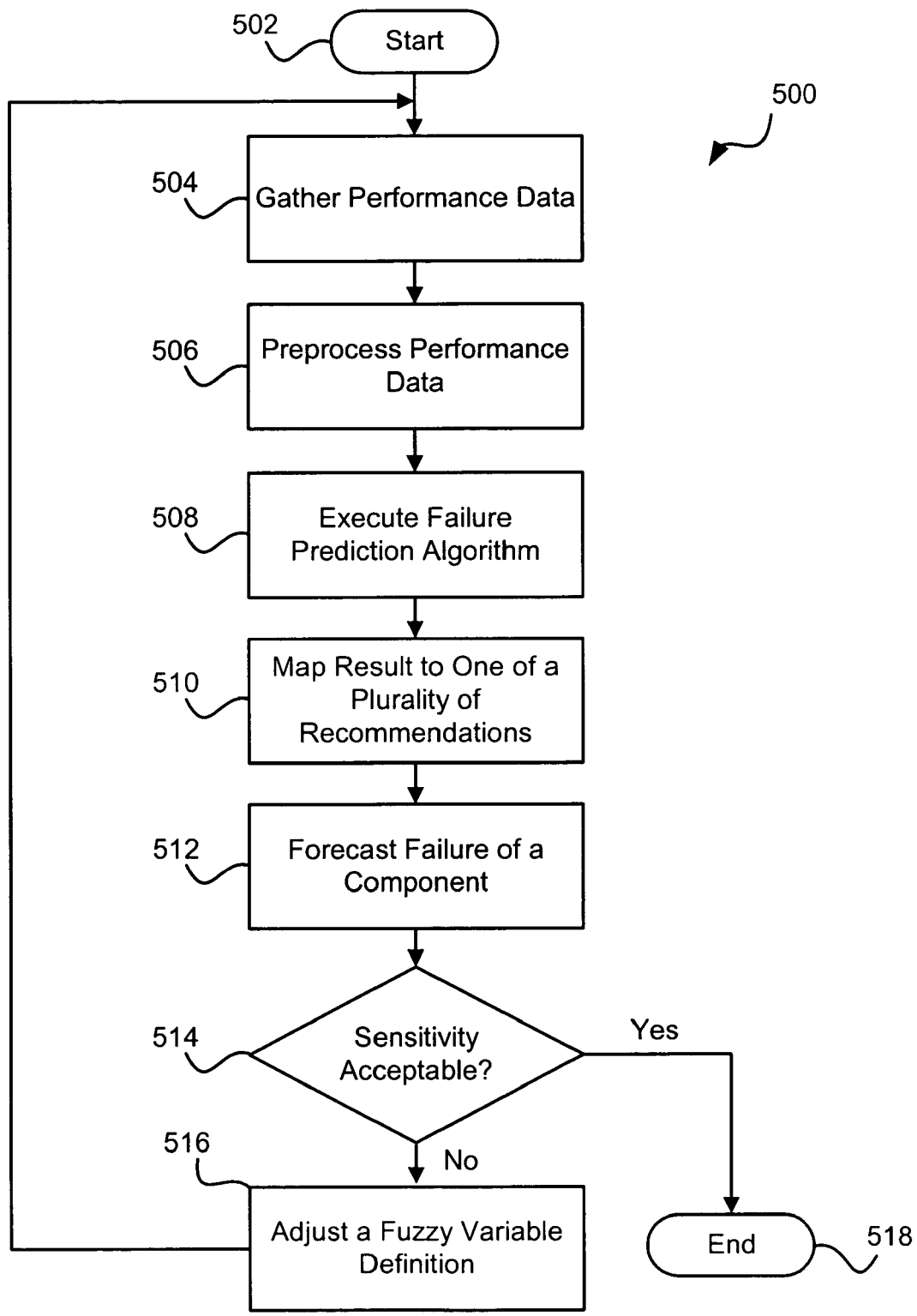
FIG. 5 is a schematic flow chart diagram illustrating operation of a method for predicting failures in a storage system.

FIG. 5 illustrates a method 500 for predicting component failure within a storage system. The method 500 starts by gathering 504 performance data. As mentioned above, the performance data may be gathered based on time or the occurrence of certain events such as mounting and unmounting of a tape 116. Preferably, performance data includes historical and event based information. Typically, the more performance data that is gathered the more accurately the failure prediction algorithm 206 is able to forecast failure of specific components. As used herein, the components may constitute a tape drive 112 or a tape 116. However, the present invention may be implemented such that subcomponents of the tape drive 112 may be forecast to fail. Such an implementation is considered within the scope of the present invention.

In certain embodiments, the performance data is preprocessed 506. Preprocessing of data allows historical data related to time to be included in the same failure prediction algorithm 206 that includes performance data related to an event such as a mount. Typically, the preprocessing involves combining and averaging performance data to compute specific raw values for use by the failure prediction algorithm 206.

Next, the failure prediction algorithm 206 is executed 508 using input data derived from the preprocessing of performance data. Of course, certain performance data may be included without any preprocessing. The failure prediction algorithm 206 produces a result. As mentioned above, the result may comprise a drive quality value and a tape quality value. The result is mapped 510 to one of a plurality of predefined recommendations. The mapping may be defined by ranges or thresholds to translate a drive quality and tape quality into a recommendation. For example, if the tape quality is thirty-five percent, the recommendation may be that the data on the tape 116 be migrated to a new tape.

If the result is below/above a threshold for a predefined recommendation, failure of one or more components, tape drive 112 or tape 116, is forecast 512 to a user or application managing the tape drive 112 and/or tape 116. In certain embodiments, a notification is produced and sent to the user or application.

In certain embodiments, a user of the tape drive 112 and/or tape 116 may make a determination 514 regarding the sensitivity of the failure prediction algorithm 206. The fuzzy logic rules of the failure prediction algorithm 206 involve fuzzy sets, defined in more detail below. In certain embodiments, the definitions of the fuzzy sets include values that are compiled into the machine code (hard coded). In certain embodiments, these values may be defined as configuration parameters. If these configuration parameters are changed, the definition of the fuzzy sets and thus the fuzzy variables is also changed.

Consequently, in certain embodiments, if a user is not satisfied with the sensitivity of the failure prediction algorithm 206 to certain types of temporary or soft errors, a user may adjust 516 one of the fuzzy variable definitions by changing one or more of the configuration parameters that cooperate to define the fuzzy variable. In this manner, a user is able to tune the failure prediction algorithm 206. If the sensitivity of the failure prediction algorithm 206 is acceptable, the method 500 ends 518.

The present invention includes a failure prediction algorithm 206 that preferably comprises fuzzy logic rules. Fuzzy logic rules are conditional statements implemented in a fuzzy logic system. A conventional logic system involves conditional expressions and operators that evaluate values according to standard set theory. This requires that a value within the system be either greater than, less than, or equal to another value. The conditional expression must evaluate to true or false for the computer to continue executing the algorithm. The conditional expression can not evaluate to a maybe or intermediate result. Boundaries between membership and non-membership in the standard set are fixed and discrete. Accordingly, conventional failure prediction algorithms use threshold values to make the determination due to the limitations of the conventional set operators.

As mentioned above, this results in algorithms that are complicated and unable to anticipate tape drive 116 or tape 112 failure without having too many false positives or allowing too many permanent errors. The difficulty arises because the input values for a failure prediction algorithm such as that discussed herein are not precise values. For example, the temporary error rate is a rate of error over a given mount or an average number of errors for a set number of mounts. Performance of a tape 116 is influenced by circumstances that are tracked and untracked, such as power fluctuation within a tape drive 112 during the mount, humidity in the room, the structural integrity of a particular length of tape, etc. Although certain performance data may be collected, the data is often not completely precise and does not include untracked influences.

The failure prediction algorithm seeks to anticipate how patterns and behavior of the past and present will affect performance in the future. The goal is to determine the quality of a tape drive 112 and/or tape 116. Quality is very subjective and imprecise. There is a certain degree of imprecision in the performance data. Even small mounts of imprecision can dramatically affect the determination made on a result from a conventional failure prediction algorithm using convention set theory.

In contrast, fuzzy logic systems enable a computer, which is limited to true and false determinations, to make determinations involving imprecision. Specifically, the present invention allows for determining subjective characteristics such as quality.

Fuzzy logic is based on natural language and is conceptually easy to understand. Fuzzy logic allows for imprecise data, can be revised and augmented without starting over, and readily captures the experience of experts in a particular field. A fuzzy logic system includes fuzzy variables, also referred to as linguistic variables because the fuzzy variables are in a natural language.

A linguistic variable combines a plurality of subjective categories into one distinct grouping. Each subjective category is a term of the linguistic variable. As a whole, a linguistic variable represents a certain attribute of a target system. The target system is the object that is being evaluated, such as a tape drive 112 or tape 116. Typically, a linguistic variable is represented by a noun in a natural language and the terms are represented as adjectives.

A fuzzy logic system begins by translating discrete, 'crisp,' values into fuzzy sets according to membership functions. A membership function defines a degree to which the crisp value satisfies the linguistic concept of a term of a fuzzy variable. Instead of distinct membership or non-membership, the membership function expresses a degree of membership ranging between zero and one for a crisp value in relation to a linguistic term.

FIG. 6A illustrates a graph 600 of one exemplary fuzzy variable 602. Those of skill in the art will recognize that the present invention may beneficially use a plurality of such fuzzy variables. Other fuzzy variables may include permanent error rate, soft error rate, number of datasets written, number of write errors, number of read errors, and the like.

In FIG. 6A, the fuzzy variable 602 is temporary_error_rate which represents the number of errors a tape 116 or tape drive 112 encountered during a tape mount. The horizontal axis 604 represents the axis for translating a crisp discrete value, referred to as a base variable 606, into a fuzzy set. In the example, the base variable 606 is the number of tape blocks processed before a temporary error is experienced. The horizontal axis 604 includes numbered hash marks for each one thousand blocks. Preferably, the range for the base variable extends between the two extremes possible for actual performance data. The range may also include negative values. The vertical axis 608 represents the degree of membership, $\mu(x)$, and ranges between zero and one.

The graph 600 includes lines defining membership functions for three terms: good 610, marginal 612, and bad 614. Each line for a membership function is drawn using either a solid line or a different dashed line for clarity. In addition, where the membership function lines 610, 612, and 614 are zero and would follow the horizontal axis, the membership function lines 610, 612, and 614 have been raised and separated so that differences between the lines are distinguishable.

A fuzzy variable 602 may include any number of terms 610, 612, 614. Typically, a fuzzy variable 602 is a linguistic variable. A linguistic variable is a word or phrase in a natural human language, such as English, that describes an attribute or characteristic about a system or environment. Preferably, the word or phrase is the same as that used by experts and users involved in the system or environment on a frequent basis.

Preferably, the linguistic variable represents a characteristic that is subjective and has imprecise or even ambiguous boundaries. The characteristic is not adequately defined by a discrete quantity or number. Instead, the linguistic variable is related to quality. Examples, of linguistic variables may include temperature, speed, tape quality, drive quality, and the like.

The terms of a linguistic variable (fuzzy variable) describe different subjective degrees for the state or condition of the characteristic defined by the linguistic variable. For example, terms for a fuzzy variable temperature may be hot, cold, and warm. A linguistic variable may include as many terms are desirable. In the temperature example, terms very_hot and very_cold may also be defined.

Preferably, in the present invention the linguistic variables include less than four terms. In a more preferred embodiment, certain linguistic variables include less than three terms. If two to three terms are defined for the linguistic variables (fuzzy variables), the number of potential combinations of terms and fuzzy variables for defining fuzzy logic rules (described in more detail below) is kept small. In this manner, the present invention ensures that the fuzzy logic rules are simple and readily understandable.

The fuzzy logic system translates an actual measured or calculated value such as performance data into a fuzzy set using the membership functions for each term 610, 612, 618 of the fuzzy variable 602. For example, suppose for a given tape mount the number of blocks processed without a temporary error is 1,040. The fuzzy set is defined by identifying where on each of the term lines 610, 612, 614, the 1,040 position intersects. Consequently, the degree of membership is 0.0 for the good line 610, 0.178 for the marginal line 612, and 0.78 for the bad line 614. The temporary error rate for this example may be expressed completely in a natural language such as: "The temporary error is pretty bad, not very marginal, and not good." Symbolically, the fuzzy set is written as $\mu(0.0, 0.178, 0.78)$. If the base variable is 5,000 blocks, the fuzzy set is defined as $\mu(1.0, 0.0, 0.0)$.

Typically, fuzzy variables 602 are continuous lines along the whole range of values for the base variable 606. Consequently, the fuzzy variable may be defined by tuples that represent transition points along each term line 610, 612, 614. For example, in FIG. 6A, the tuples of pairs for the bad term line 614 may be ((0, 0), (0, 1), (1000, 1), (1500, 0)). These tuples may be defined with the failure prediction algorithm 206 in a human-readable format. Alternatively, configuration parameters of a tape drive 112 may allow a user to change these tuples. By changing the tuples for a fuzzy variable, a user can shift the slope and/or change the shape of the area under the term line 610, 612, 614. In this manner, a user may tune the failure prediction algorithm 206.

In one embodiment, the desired fuzzy variables are predefined by one familiar with the terminology and subject terms used to judge quality of storage systems and components. Alternatively, the experts most familiar with a storage system may be included in the defining of the fuzzy variables. Once all the fuzzy variables are defined, one or more fuzzy logic rules may be drafted.

FIG. 6B illustrates a few representative examples of fuzzy logic rules 616. A fuzzy logic rule 616 is a simple conditional statement that include an antecedent 618 and a consequent 620. The antecedent 618 preferably comprises a conditional statement. The conditional statement includes one or more fuzzy logic expressions 622 separated by operators 624. The expressions 622 are clauses that include a fuzzy variable 602, a verb such as "IS" or "IS NOT," and a term. In one embodiment, the operators 624 are "AND" or "OR."

Using fuzzy variables 602, terms, and desired operators 624 a user 204 such as an expert in the field of data storage can readily draft the antecedent 618 for a fuzzy logic rule. The conditional statement is expressible in natural terms that are familiar to the user 204. The user 204 may use the same subjects, adjectives, and verbs in a fuzzy logic rule 616 as he/she uses in their ordinary course of business. In addition, the conditional statement readily accommodates imprecision through the use of terms.

The consequent 620 is also a fuzzy logic expression 622. Typically, the consequent 620 defines the term to be associated with a qualitative fuzzy variable. For example, in FIG. 6B, all the illustrated fuzzy logic rules 616 define the term to be associated with mount_quality. Note, that from FIG. 6B, it can readily be determined that the mount_quality fuzzy variable 602 has at least three terms: high, low, and very_low. The fuzzy logic rules are simple, intuitive and read like natural language sentences. The logic of the fuzzy logic rules corresponds well to logic used by people and allows for use of qualitative terminology and subjective terminology.

Certain fuzzy logic rules may include no operators 624. For example, the last fuzzy logic rule listed indicates that if there are any permanent errors, the quality associated with the mount_quality should be very low. A user 204 drafting a failure prediction algorithm 206 may include as few or as many fuzzy logic rules as desired. The number of input fuzzy variables 602, operators 624, and terms may be combined in various ways to produce a fuzzy logic rule 616 for each possible permutation. The user 204 is not required to enter a fuzzy logic rule 616 for each permutation.

Referring now to FIGS. 6A and 6B, a brief explanation of operation of a representative fuzzy logic system that implements the fuzzy variable and fuzzy logic rules illustrated in FIGS. 6A and 6B will be provided. First, the failure prediction algorithm 206 fuzzifies input variables provided by a performance monitor 302 or preprocessor 314. This means that a crisp value such as temporary error rate of 1,040 is translated into its corresponding degree of membership. i.e. $\mu(0.0, 0.178, 0.78)$ in the example above. Each input fuzzy variable is fuzzified. Next, the fuzzy logic system reviews the fuzzy logic rules 616, identifying those for which the antecedent 618 evaluates to true. First, expressions 622 of the antecedent are evaluated. If the fuzzy logic variable of an expression includes an "IS" operator, than any degree of membership for the term of that fuzzy variables causes the expression to evaluate to true.

For example, in the first fuzzy logic rule of FIG. 6B, if the fuzzy set defined as $\mu$(good, marginal, bad) is $\mu(0.0, 0.178, 0.78)$. The first expression 622 evaluates to the value 0.78 (the degree of membership in the bad term). Suppose the datasets_written fuzzy variable has the following fuzzy set $\mu$(enough, not_enough) and is equal to $\mu(0.6, 0.0)$. So, the second expression 622 evaluates to 0.6. Next, the fuzzy logic system combines the first expression 622 and second expression 622 using the operator 624. In the first fuzzy logic rule, the operator 624 is "AND." Consequently, the fuzzy logic system computes the minimum function on the results of first and second expressions. If the operator 624 is an "OR," the maximum function is used.

In this example, the minimum expression results in a value of 0.6. This value represents the degree to which the fuzzy variable of the consequent 620 is a member of the listed term. The mount_quality may comprise a fuzzy set defined as $\mu$(high, very_high, marginal, very_low, low). In this example, the mount_quality may be $\mu(0.0, 0.0, 0.0, 0.0, 0.6)$. Accordingly, the result of the consequent 620 is a fuzzy set defined by the low term and bounded along the vertical axis 608 by zero and 0.6.

The process described above is referred to as fuzzy logic calculus. The fuzzy logic system completes a similar set of evaluations for any other fuzzy logic rules for which the antecedent evaluates to true. Consequently, depending on the fuzzy logic rules written and the performance data available, certain fuzzy logic rule consequents 620 may or may not be evaluated. Once the fuzzy logic system has evaluated as many consequents as applicable, a defuzzification process takes place.

In the defuzzification process, the fuzzy logic system combines one or more fuzzy sets defining the consequents 620 to arrive at a single crisp, discrete value which is the result of the failure prediction algorithm 206. In one embodiment, the defuzzification process comprises combining each consequent fuzzy set by taking the weighted average of the centroid for the area defined by each consequent fuzzy set on a membership function graph similar to that depicted in FIG. 6A.

Preferably, the fuzzy logic system of the present invention includes functions such as MAX/MIN and weighted averages for conducting the fuzzy calculus. Those of skill in the art, however, will recognize that the present invention may be practiced with a variety of different fuzzy inference and defuzzification functions including AVG/MAX, Gamma, Center of Maximum (CoM), Fast Center of Area (CoA), Mean of Maximum (MoM), Hyper CoM, and the like.

Figure 7:
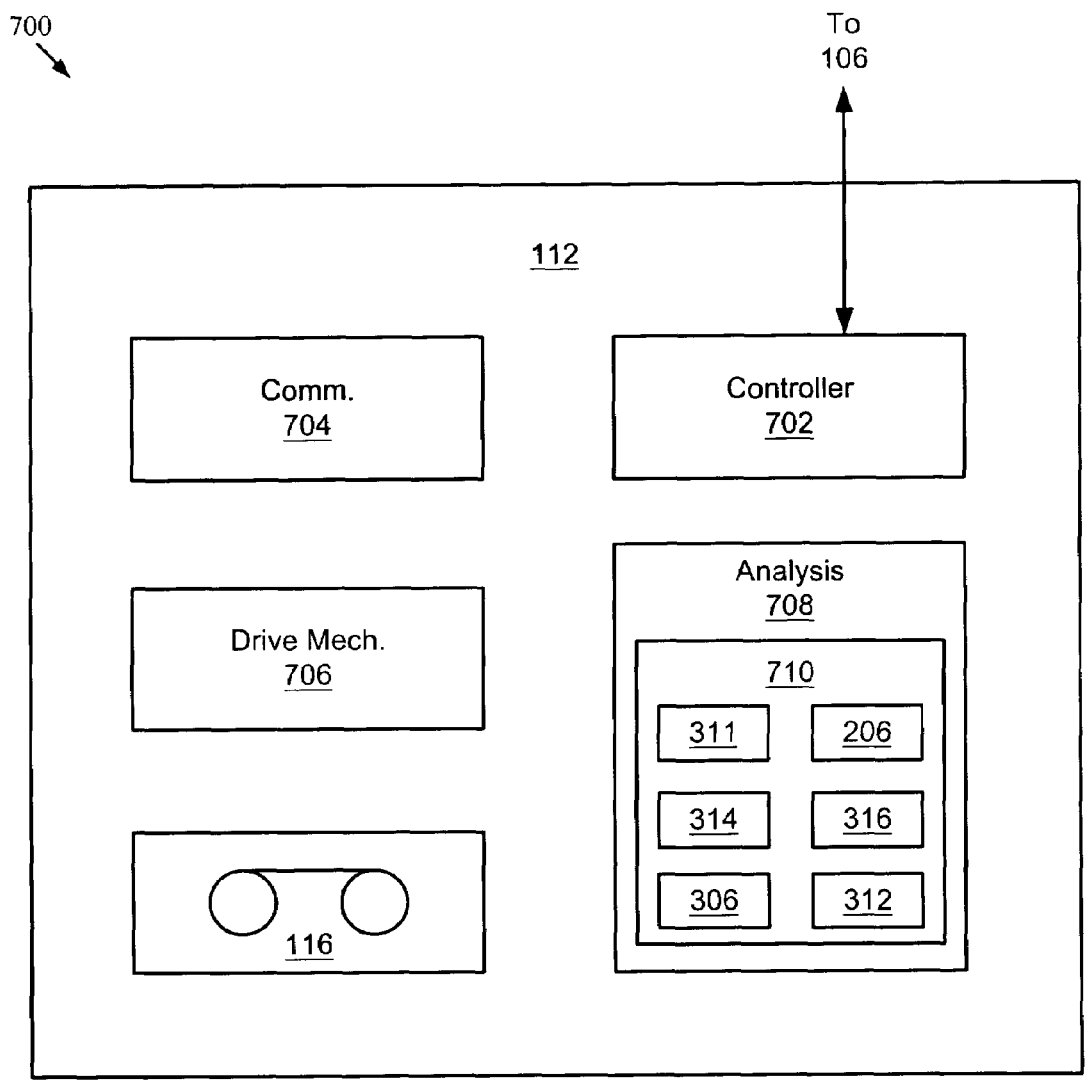
FIG. 7 is a block diagram illustrating one embodiment of a system in accordance with the present invention.

FIG. 7 illustrates a representative example of a system 700 for predicting component failure within a storage system. The system 700 may implement the present invention within a single storage unit such as a tape drive unit 112. Alternatively, the present invention may be distributed among a plurality of controllers, drives, and software modules.

The system includes a controller 702 configured to manage data transactions with a host 106. The controller 702 responds to control commands for storing and retrieving data from a storage media. Preferably, the controller 702 supports a plurality of data storage communication protocols.

The controller 702 is in communication with a communication module 704 configured to exchange data between the host 106 and the storage media, which may be a media cartridge 116. The communication module 702 may provide error checking and error recovery for data stored in the media cartridge 116.

The communication module 702 communicates with a drive mechanism 704 to facilitate use of the media cartridge 116. The drive mechanism 704 may advance, rewind, spin, or otherwise physically manipulate the media cartridge 116. In addition, the drive mechanism 704 includes the hardware for reading data from and writing data to the media cartridge 116.

The system 700 also includes an analysis module 708. The analysis module 708 executes machine-readable code 710. The machine-readable code 710 is programmed to selectively predict failure of the media cartridge 116 or the drive mechanism 706. The machine-readable code 710 may include modules (not shown) configured to measure performance data regarding the media cartridge 116 and/or the system 700.

The machine-readable code 710 predicts failures in response to a result from a failure prediction algorithm 206 that preferably includes fuzzy logic rules. The failure prediction algorithm 206 determines the result using performance data for the media cartridge 116 and/or the drive mechanism 704. In certain embodiments, a preprocessor 314 combines and/or averages certain performance data before the performance data is used by the failure prediction algorithm 206. In addition, a post processor 316 may defuzzify the result of the failure prediction algorithm 206 to produce a crisp value. A determination module 306 maps the crisp value to one of a plurality of predefined recommendations. If a recommendation warrants notification of a user, a notification module 312 produces a notification that is communicated to a user or application.

In one embodiment, the machine-readable code 710 includes an interface 311 configured to allow a user to selectively adjust a fuzzy variable definition to tune the failure prediction algorithm 206. For example, the interface 311 may comprise user-adjustable values that define the transition points, which may be the tuples for pairs defining one or more terms of one or more fuzzy variables, as discussed above with reference to FIG. 6. In one embodiment, the interface 311 may comprise tools for viewing and setting these transition points. By changing these transition points using the interface 311 a user may adjust the failure prediction algorithm 206.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for developing failure prediction software for a storage system, the method comprising:
    assisting an end-user of a storage system in generating a failure prediction algorithm for the storage system, the failure prediction algorithm comprising fuzzy logic rules, the failure prediction algorithm stored in a natural language format;
    generating machine-readable code from the stored failure prediction algorithm in response to input from an end-user, the machine-readable code configured to execute on the storage system;
    testing the machine-readable code with sample data to produce a result in response to input from an end-user;
    selectively revising the failure prediction algorithm in response to input from an end-user such that the result corresponds to an expected result; and
    tuning the failure prediction algorithm dynamically at runtime by adjusting a fuzzy variable definition in response to input from an end-user of the storage system.

2. The method of claim 1, wherein the fuzzy logic rules comprise linguistic variables having less than four terms.

3. The method of claim 1, wherein certain linguistic variables comprise less than three terms.

4. The method of claim 1, further comprising revising the failure prediction algorithm by way of a text editor.

5. The method of claim 1, wherein the fuzzy logic rules are defined by conditional statements that include subjects, adjectives, and verbs familiar to personnel in the storage system field.

6. A method for predicting component failure within a storage system, the method comprising:
    gathering performance data for a storage system;
    executing a failure prediction algorithm on the performance data to produce a result, the failure prediction algorithm comprising fuzzy logic rules generated by an end-user of the storage system, the fuzzy logic rules defined by conditional statements that include subjects, adjectives, and verbs familiar to personnel in the storage system field;
    tuning the failure prediction algorithm dynamically at runtime by adjusting a fuzzy variable definition in response to input from an end-user of the storage system; and
    selectively forecasting failure of one or more components of the storage system in response to the result.

7. The method of claim 6, further comprising mapping the result to one of a plurality of predefined recommendations.

8. The method of claim 6, further comprising producing a notification in response to the result.

9. The method of claim 6, further comprising pre-processing performance data to provide input data for the failure prediction algorithm.

10. An apparatus for developing failure prediction software for a storage system, comprising:
    an editor to assist an end-user of a storage system in generating a failure prediction algorithm comprising fuzzy logic rules, the failure prediction algorithm stored in a natural language format;
    a code generator to generate machine-readable code from the stored failure prediction algorithm in response to input from an end-user;
    a test module to test the machine-readable code with sample data to produce a result in response to input from an end-user;
    a revision module to allow revisions of the failure prediction algorithm in response to input from an end-user such that the result corresponds to an expected result;
    an interface to tune the failure prediction algorithm dynamically at runtime by adjusting a fuzzy variable definition in response to input from an end user of the storage system.

11. The apparatus of claim 10, wherein the fuzzy logic rules comprise linguistic variables having less than four terms.

12. The apparatus of claim 10, wherein the test module further tunes the failure prediction algorithm by adjusting a fuzzy variable definition in response to user input.

13. The apparatus of claim 10, wherein the machine-readable code is configured to execute on a storage system.

14. The apparatus of claim 10, wherein the revision module comprises a text editor to revise the failure prediction algorithm in response to user input.

15. The apparatus of claim 10, wherein the fuzzy logic rules are defined by conditional statements that include subjects, adjectives, and verbs familiar to personnel in the storage system field.

16. An apparatus for predicting component failure within a storage system, the apparatus comprising:
    a performance monitor to gather performance data for a storage system;
    a processor to execute a failure prediction algorithm on the performance data to produce a result, the failure prediction algorithm comprising fuzzy logic rules generated by an end-user of the storage system;
    a determination module to selectively forecast failure of one or more components of the storage system in response to the result; and
    an interface to dynamically adjust a predefined quality threshold of the determination module at runtime in response to input from an end-user, thereby adjusting the degree of data loss risk and remedial costs associated with a forecasted failure of one or more components.

17. The apparatus of claim 16, wherein the interface further adjusts a fuzzy variable definition to tune the failure prediction algorithm in response to input from an end-user.

18. The apparatus of claim 17, further comprising a pre-processor to pre-process performance data to provide input data for the failure prediction algorithm.

19. The apparatus of claim 18, wherein the determination module maps the result from the failure prediction algorithm to one of a plurality of predefined recommendations.

20. The apparatus of claim 19, further comprising a notification module to produce a notification in response to the result.

21. A system for predicting component failure within a storage system, the system comprising:
- a controller to control and manage data transactions with a host;
- a communication module to exchange data between the host and a storage media;
- a drive mechanism to read data from the storage media and write data to the storage media; and
- an analysis module to execute machine-readable code programmed to selectively predict failure of the storage media and the drive mechanism in response to a result from a failure prediction algorithm comprising fuzzy logic rules and performance data associated with the storage media and the drive mechanism, the machine-readable code comprising an interface to selectively adjust a fuzzy variable definition to tune the failure prediction algorithm dynamically at runtime in response to input from an end-user of the storage media and the drive mechanism.

22. The system of claim 21, wherein the machine-readable code further comprises a pre-processor to pre-process performance data to provide input data for the failure prediction algorithm.

23. The system of claim 22, wherein the machine-readable code further comprises a determination module to map a result from the failure prediction algorithm to one of a plurality of predefined recommendations.

24. The system of claim 23, wherein the machine-readable code further comprises a notification module to produce a notification in response to the result.

25. An apparatus for developing failure prediction software for a storage system, comprising:
- means for assisting an end-user of a storage system in generating a failure prediction algorithm comprising fuzzy logic rules, the failure prediction algorithm stored in a natural language format;
- means for generating machine-readable code from the stored failure prediction algorithm, the machine-readable code configured to execute on the storage system;
- means for testing the machine-readable code to produce a result;
- means for selectively revising the failure prediction algorithm in response to input from an end-user such that the result corresponds to an expected result; and
- means for dynamically tuning the failure prediction algorithm at runtime by adjusting a fuzzy variable definition in response to input from an end-user of the storage system.

26. The apparatus of claim 25, wherein the fuzzy logic rules comprise linguistic variables having less than four terms.

27. The apparatus of claim 25, wherein the machine-readable code is configured to execute on a storage system.

28. The apparatus of claim 25, further comprising means for revising the failure prediction algorithm by way of a text editor.

29. The apparatus of claim 25, wherein the fuzzy logic rules are defined by conditional statements that include subjects, adjectives, and verbs familiar to personnel in the storage system field.

30. An article of manufacture comprising a program storage medium readable by a processor and embodying one or more instructions executable by a processor to perform a method for developing failure prediction software for a storage system, the method comprising:
- assisting an end-user of a storage system in generating a failure prediction algorithm for the storage system, the failure prediction algorithm comprising fuzzy logic rules, the failure prediction algorithm stored in a natural language format;
- generating machine-readable code from the stored failure prediction algorithm in response to input from an end-user, the machine-readable code configured to execute on the storage system;
- testing the machine-readable code with sample data to produce a result in response to input from an end-user;
- selectively revising the failure prediction algorithm in response to input from an end-user such that the result corresponds to an expected result;
- tuning the failure prediction algorithm dynamically at runtime by adjusting a fuzzy variable definition in response to input from an end-user of the storage system.

31. The article of manufacture of claim 30, wherein the fuzzy logic rules comprise simple conditional statements that include subjects, adjectives, and verbs that are commonly used to describe error conditions of a storage system.

32. The article of manufacture of claim 31, wherein the method further comprises revising the failure prediction algorithm by way of a text editor.

33. The article of manufacture of claim 32, wherein revising the failure prediction algorithm comprises adding fuzzy logic rules to the failure prediction algorithm.

* * * * *